United States Patent [19]
Hirasawa et al.

[11] Patent Number: 4,875,768
[45] Date of Patent: Oct. 24, 1989

[54] MICROFICHE READING APPARATUS

[75] Inventors: Hideaki Hirasawa; Nobuo Ueda, both of Osaka, Japan

[73] Assignee: Minolta Camera Kabushiki Kaisha, Osaka, Japan

[21] Appl. No.: 176,755

[22] Filed: Apr. 1, 1988

[30] Foreign Application Priority Data

Apr. 3, 1987 [JP] Japan .................................. 62-83377
Apr. 3, 1987 [JP] Japan .................................. 62-83379

[51] Int. Cl.$^4$ ............................................ G03B 23/08
[52] U.S. Cl. ................................................ 353/27 A
[58] Field of Search ..................... 353/25, 27 R, 27 A, 353/22–24, 97, 120

[56] References Cited

U.S. PATENT DOCUMENTS

| | | |
|---|---|---|
| 3,885,867 | 5/1975 | Nelson et al. ..................... 353/27 A |
| 3,926,426 | 12/1975 | Toriumi et al. . |
| 4,033,684 | 7/1977 | Toriumi ............................. 353/27 A |
| 4,134,674 | 1/1979 | Ohsaki et al. . |
| 4,283,136 | 8/1981 | Swift et al. . |
| 4,339,182 | 7/1982 | Ueda et al. . |
| 4,549,797 | 10/1985 | Sawano et al. ................... 353/27 A |

FOREIGN PATENT DOCUMENTS

| | | |
|---|---|---|
| 8602174 | 4/1986 | European Pat. Off. .......... 353/27 A |
| 51-42440 | 4/1976 | Japan . |
| 52-109349 | 9/1977 | Japan . |

Primary Examiner—Harry N. Haroian
Attorney, Agent, or Firm—Burns, Doane, Swecker & Mathis

[57] ABSTRACT

A microfiche reading apparatus for retrieving frame images recorded on a microfiche. This apparatus is automatically initialized in accordance with format information recorded in a bar code in a marginal section of the microfiche outside an image recording area. The apparatus comprises a movable support for the microfiche, a sensor for reading the bar code, and a control system for controlling movement of the support in response to the format information.

20 Claims, 11 Drawing Sheets

MICROFICHE READING APPARATUS

BACKGROUND OF THE INVENTION (1) Field of the Invention

The present invention relates to a microfiche reading apparatus for retrieving frame images recorded on a microfiche film.

(2) Description of the Prior Art

In searching a microfiche film with a microfiche reading apparatus, it is necessary to input format data, and data regarding the positions and number of indices, types of information recorded on the film and a classification code of the film. Conventionally, these data are set by operating dip switches or by input from a keyboard.

However, it is troublesome for the general user having little knowledge of the microfiche to input these data one by one. Wrong data could be set by such a user, which would paralyze a retrieval operation.

Besides inputting the above data, it is necessary in conducting a film search to designate a retrieval address for a frame image to be retrieved. This address designation causes a target position to be derived from an operation of a current position and standard frame pitches. Then a microfiche carrier is moved to the target position and the aimed frame image is projected on a screen.

The positions in which the images are recorded subtly vary from image to image on the same microfiche film, let alone different films. This results in the inconvenience that the image in the above target position is projected eccentrically on the screen. Each retrieval operation, therefore, involves the troublesome operation of a fine adjust key for moving the retrieved image to a correct position on the screen.

SUMMARY OF THE INVENTION

Accordingly, the present invention has for a principal object to provide an improved microfiche reading apparatus which solves the problems noted above.

Another object of the invention is to provide a microfiche reading apparatus capable of correctly setting information necessary to a film search without bothering the operator.

A further object of the invention is to provide a microfiche reading apparatus which is very convenient to use and is capable of reducing the number of fine adjustments with an increase in the number of retrieval operations.

The above objects are fulfilled, according to the present invention, by a microfilm reader comprising optical means including a light source and a projecting lens for projecting micro-images, microfilm support means for supporting the microfiche film and movable longitudinally and transversely on a plane substantially perpendicular to a projecting optical path of the optical means, drive means for moving the support means, read means for reading coded information relating to a format of the microfiche film, the coded information being provided in a region outside the micro-images on the microfiche film, and control means for controlling the drive means in response to the format information read by the read means.

This microfilm reader may further comprise an insert opening for inserting the microfiche film, transport means for transporting the microfiche film inserted through the insert opening to the support means, and display means for displaying the format information read by the read means. In this case, the read means is provided on a film transport passage of the transport means. The microfilm reader may also comprise input means for inputting addresses of the micro-images to be retrieved. Then the control means includes retrieval means for controlling the drive means to move the support means so that a micro-image at an address input by the input means is placed on the projecting optical path.

The format information may include index information indicative of a position of an index image on the microfiche film recording indices. Further, means may be provided for controlling the drive means in accordance with the index information to place the index image on the projecting optical path.

The objects of the present invention are fulfilled also by a microfilm reader comprising optical means including a light source and a projecting lens for projecting micro-images; film support means for supporting the microfiche film and movable longitudinally and transversely on a plane intersecting a projecting optical path of the optical means; drive means for moving the support means; first input means for designating an address of a micro-image selected from a plurality of micro-images on the microfiche film; memory means for storing the address of the micro-image designated by the first input means, frame pitches of the micro-image, and a current position of the film support means; control means for calculating amounts of movement of the film support means from the address of the micro-image, the frame pitches of the micro-image, and the current position stored in the memory means, and controlling the drive means to place the micro-image designated by the first input means on the projecting optical path; second input means for inputting directions of movement of the film support means; and correcting means for controlling the drive means to move the support means in the directions input by the input means, and correcting the current position and the frame pitches stored in the memory means in accordance with the amounts of movement.

This microfilm reader may further comprise initializing means for initializing values of the frame pitches stored in the memory means. The initializing means may include read means for reading coded information relating to a format of the microfiche film provided on the microfiche film, the frame pitches being initialized in accordance with the format information read by the read means.

In a preferred embodiment of the invention, the microfilm reader has an insert opening for inserting the microfiche film, and transport means for transporting the microfiche film inserted through the insert opening to the support means. In this case, the read means is provided on a film transport passage of the transport means.

The microfiche reading apparatus according to the present invention as described above, when a microfiche film is loaded, reads the data necessary for a searching operation recorded in a coded form on the microfiche film and automatically sets its control system in accordance with these data. Thus, the necessary data are input without bothering the operator. This feature renders the apparatus very convenient particularly to the general user having little knowledge of the microfiche.

With the above apparatus, there is no possibility of data setting errors whereby a highly reliable retrieval operation is carried out.

Further, in the microfiche reading apparatus according to the present invention, the frame pitches on the microfiche film are constantly renewed. This feature provides a great convenience in that the retrieval operation progressively becomes free of image displacement on the screen as the operation is repeated.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Figure 1:
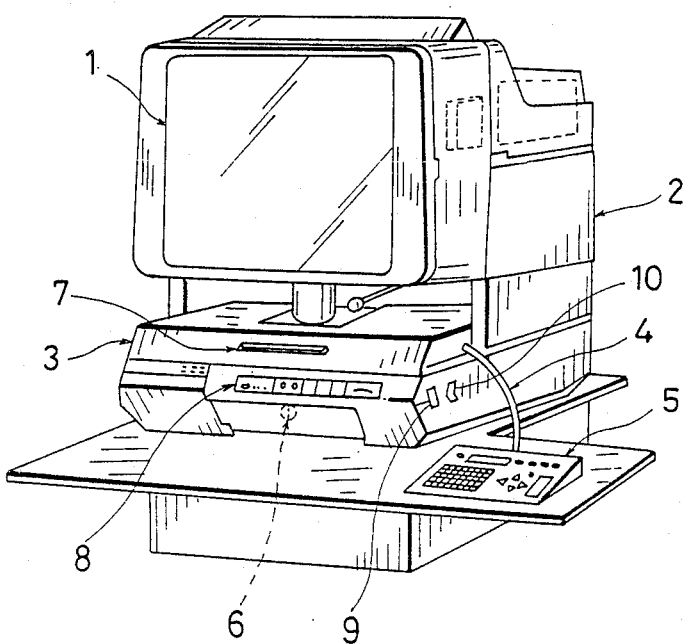
FIG. 1 is an overall perspective view of a reader-printer which is one example of microfiche reading apparatus according to the present invention.

FIG. 1 shows a reader-printer with a microfiche reading device according to the present invention for searching a microfiche film F carrying a multiplicity of images. The reader-printer comprises a main body 2 having a screen 1 centrally thereof, a microfiche moving mechanism 3 for moving the microfiche film F longitudinally and transversely on a plane substantially perpendicular to a projecting optical path, and a controller 5 connected to the microfiche moving mechanism 3 through a cable 4. Number 6 indicates a projecting optical system contained in the main body 2.

Figure 2:
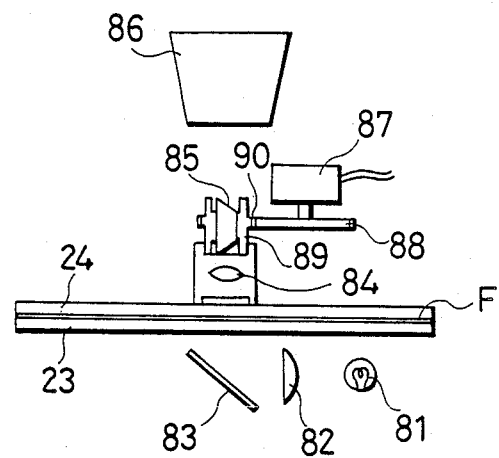
FIG. 2 is a schematic view showing an outline of a projecting optical system, FIGS. 3 (a) and (b) are views showing orientations of images projected on a screen.
Figure 3:
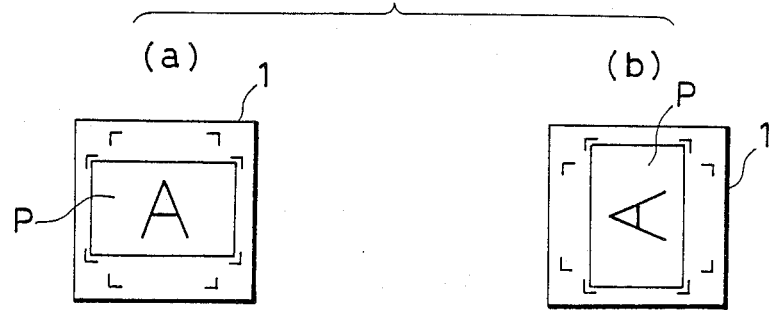

FIG. 2 schematically shows the projecting optical system. As seen, this optical system includes a light source 81, a condenser lens 82, and a reflecting mirror 83. Light from the light source 81 is formed into a parallel beam by the condenser lens 82, which is reflected upward by the reflecting mirror 83 to illuminate the microfiche film F. The light having passed the microfiche film F travels through a projecting lens 84 and an image turning prism 85 to a reader mirror 86. The light is directed by the reader mirror 86 to the screen 1 to project an image thereon. The projecting optical path leading to the screen 1 includes an optical sensor such as a CDS, not shown, for detecting whether image P displayed on the screen 1 is long from side to side as depicted in FIG. 3(a) or long from top to bottom as depicted in FIG. 3(b). When the sensor detects the sideways long image as in FIG. 3(a) and this image is copied onto a sheet long from top to bottom, the image turning prism 85 is turned 45 degrees to turn the image 90 degrees as in FIG. 3(b). This operation is carried out by actuating a pulse motor 87 in response to the detection by the sensor. More particularly, the pulse motor 37 includes a rotary shaft having a gear 88 meshed with a gear 90 defined on a periphery of a cylindrical holder 89 housing the image turning prism 85. Thus, by applying an appropriate number of pulses to the pulse motor 87, the image turning prism 85 is turned through the gears 88 and 90 and the holder 89. An image position controlling device for detecting the orientation of a projected image and automatically turning the image to a desired orientation as above has been proposed in Japanese Patent Publication Kokai No. 61-176917 in the name of the present applicant, and is not particularly described herein.

Figure 4:
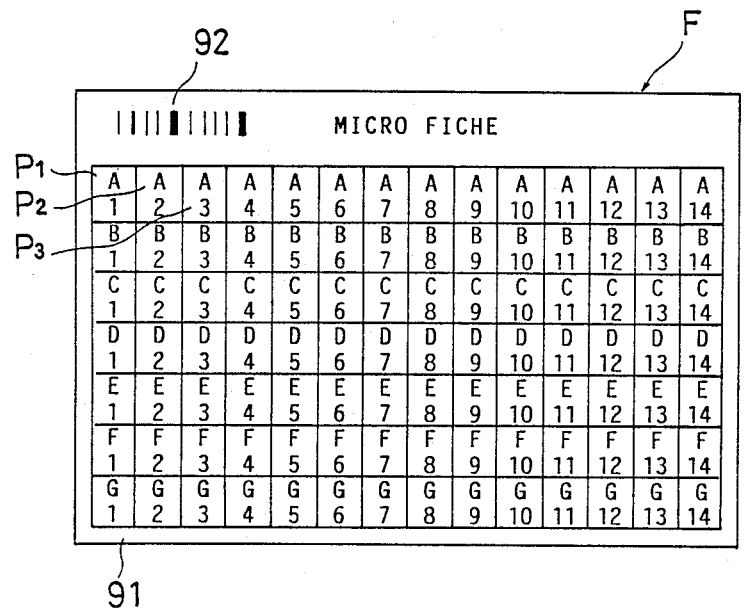
FIG. 4 is a plan view of an entire microfiche film applicable to the apparatus according to the present invention.

Referring to FIG. 4, the microfiche film F includes a multiplicity of frame images P2, P3 . . . recorded in matrix form on a film substrate 91 having an appropriate size. The film substrate 91 has information necessary for the search recorded in a bar code 92 on a top position thereof where no image is recorded. This information includes the following data (1), (2) and (3), for example:

(1) Film Format number of frames in a column x number of frames in a row, number of indices, position of indices (Where, for example, index data regarding the frame images are written in frame A1, its address A1 is indicated. These data may be written in a plurality of frames if there are a great number of frames.) and row starting addresses.

(2) Address Designating Methods rows A-P and columns in numerals, serial number designation, and direction for serial number designation (down or across).

An address may be designated by means of the row and column or by the serial number. Some microfiche films give frame numbers in the sideways order, and others give them in the vertical order. Therefore, the information as to the order in which the frames are numbered is also necessary. This information is referred to in this specification as direction for serial number designation (down or across).

(3) Retrieval Data classification of information recorded on the microfiche film, such as newspapers, patents, bank accounts, contracts, etc.

microfiche identification number for use in confirming that a correct microfiche is loaded when making an on-line microfiche search.

Data (1) above are known as format data, data (2) are those necessary for a searching operation, and data (3) relates to the contents of the film.

The main body 2 further includes an insert opening 7 for inserting the microfiche film, a control panel 8, an image turn switch 9 for turning the image turning prism 85 of the projecting optical system 6, and a power switch 10.

Figure 5:
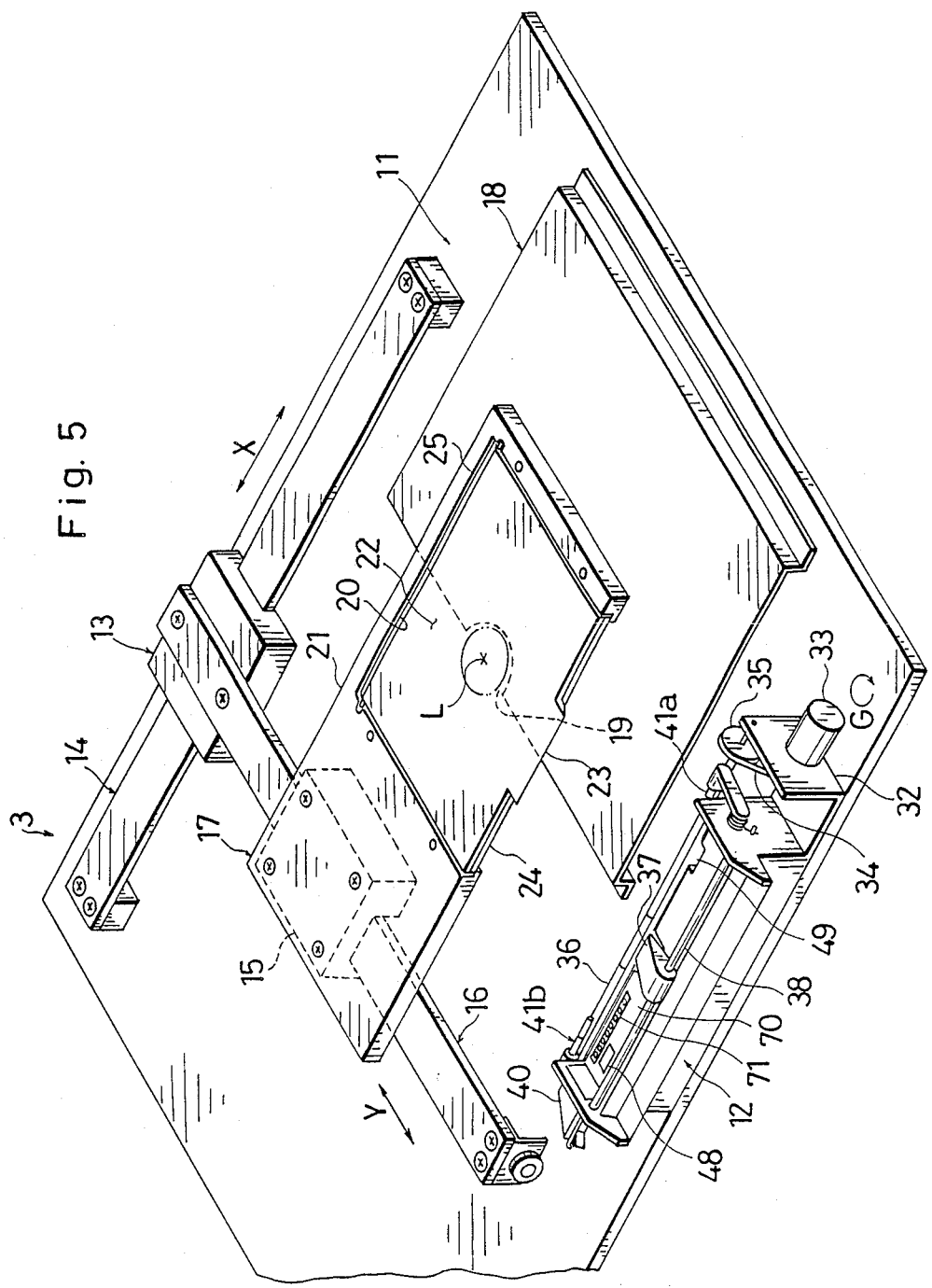
FIG. 5 is a perspective view of a microfiche moving mechanism.

Referring to FIG. 5, the microfiche moving mechanism 3 comprises an X-Y carrier section 11 and a loading block 12.

Specifically, the X-Y carrier section 11 includes a first movable deck 13, a first linear pulse motor 14 for transporting the first movable deck 13 in directions of arrow X, a second movable deck 15, a second linear pulse motor 16 having an end thereof fixed to the first movable deck 13 for transporting the second movable deck 15 in directions of arrow Y, a main X-Y carrier body 17 having an end thereof fixed to the second movable deck 15, and a slide plate 18 having a teflon-coated top surface and supporting the other end of the main X-Y carrier body. The slide plate 18 defines a semicircular cutout 19 for image projection, having a center on a projecting optical axis L.

The main X-Y carrier body 17 includes a carrier case 21 having an approximately U-shaped configuration in plan view defining a recess 20, and a film retainer 22 mounted in the recess 20 for sandwiching the microfiche film F. The carrier case 21 has a teflon-coated bottom surface for facility of its sliding movement on the slide plate 18.

Figure 6:
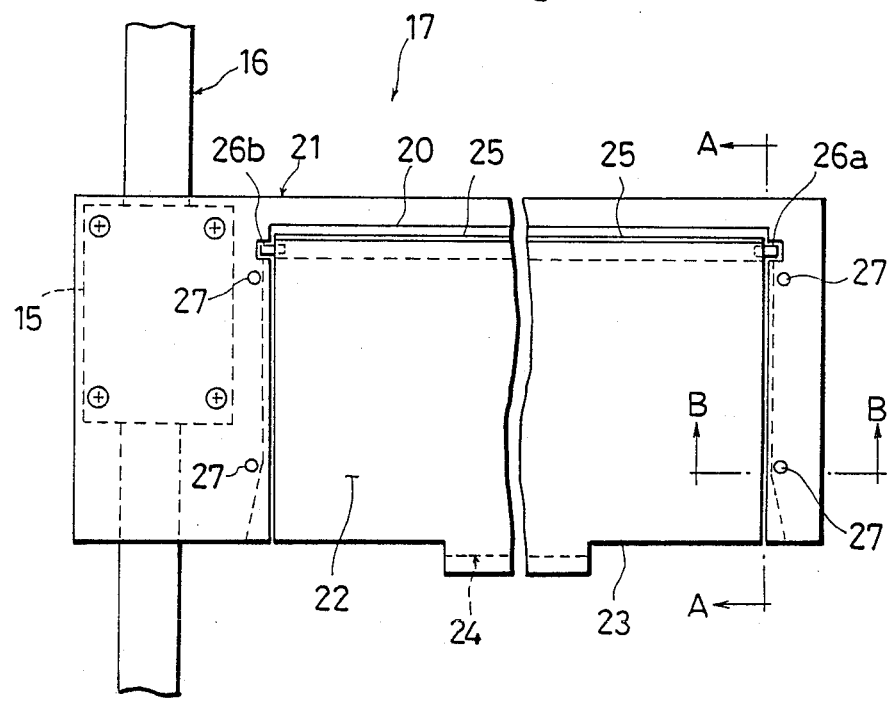
FIG. 6 is a plan view of a main X-Y carrier body.
Figure 7:
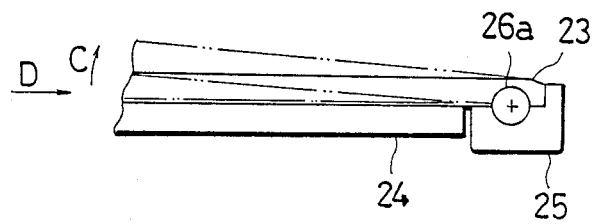
FIG. 7 is a section taken on line A—A of FIG. 6.
Figure 8:
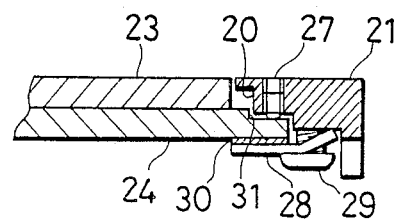
FIG. 8 is a section taken on line B—B of FIG. 7.

As shown in FIGS. 6 and 7, the film retainer 22 includes, as main components thereof, an upper glass plate 23, a lower glass plate 24, and a support member 25 secured to the upper glass plate 23. The support member 25 has a right and left pair of projecting pins 26a and 26b, and by means of these pins 26a and 26b the upper glass plate 23 rests on the carrier case 21. As also shown in FIG. 8, the carrier case 21 includes four height setting screws 27 disposed adjacent the recess 20 and adjacent four corners of the lower glass plate 24, and four support plates 28 comprising elastically deformable elements like leaf springs and opposed to the height setting screws 27, respectively. The lower glass plate 24 is held between the height setting screws 27 and the support plates 28, with the support plates 28 supporting the lower glass plate 24 at both lateral sides. Number 29 indicates a clamp for attaching each support plate 28 to the carrier case 21. The clamp 29 presses and fixes the lower glass plate 24 through the support plate 28 to the height setting screw 27. Number 30 indicates a sponge packing interposed between the lower glass plate 24 and support plate 28 to maintain them in spaced relationship. The height of upper glass plate 23 placed on the lower glass plate 24 is adjustable by adjusting the screwing depth of the screws 27, whereby the top surfaces of upper glass plate 23 and carrier case 21 are made flush. Since the screws 27 are disposed adjacent the four corners of the lower glass plate 24, the upper glass plate 23 and carrier case 21 may be made flush at all mutually close locations. The lower glass plate 24 defines stepped portions 31 which prevent the microfiche film F sandwiched between the upper glass plate 23 and lower glass plate 24 from becoming caught between the lower glass plate 24 and carrier case 21.

According to the main X-Y carrier body 17 as constructed above, the upper glass plate 23 is pivoted as shown in phantom lines in FIG. 7 in the direction of arrow C to permit entry of microfiche film F in the direction of arrow D. The support member 25 limits the movement of a leading end of microfiche film F whereby the film F stops at a correct position. Further, the top surfaces of film retainer 22 and carrier case 21 are flush with each other and the film F is placed without any inclination relative to the projecting optical axis L. All these aspects allow an image to be projected to the screen 1 with high precision. The stepped portions 31 of the lower glass plate 24 are effective to prevent the microfiche film F from becoming caught between the lower glass plate 24 and carrier case 21. Consequently, information retrieval is conveniently carried out without any trouble in insertion and removal of the microfiche film F.

Figure 9:
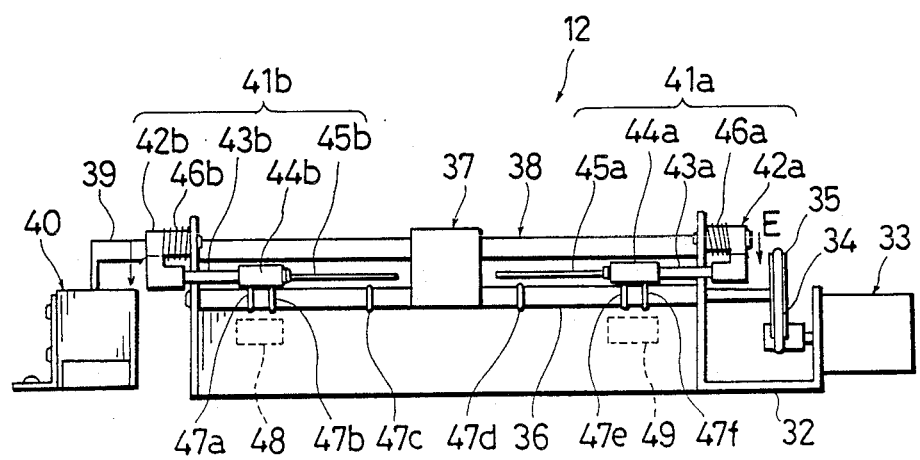
FIG. 9 is a view of a loading block as seen from the main X-Y carrier body.

The loading block 12 is provided for loading the film on and unloading it from the main X-Y carrier body 17 in home position. Referring to FIG. 9, the loading block 12 comprises a base 32, a loading motor 33 attached to the base 32, a drive shaft 36 operatively connected to the loading motor 33 through a belt 34 and a pulley 35, a lift lever 37 for lifting the upper glass plate 23, a lift lever shaft 38 fixedly carrying the lift lever 37, and a solenoid 40 operatively connected to the lift lever shaft 38 through a lift lever arm 39. Numbers 41a and 41b indicate a right and left pair of guide roller assemblies each including an arm 42a or 42b having a proximal end thereof attached to the base 32, a guide roller 43a or 43b fitted in a distal end of the arm 42a or 42b, a plastic ring 44a or 44b covering a distal end region of the roller 43a or 43b, and a guide member 45a or 45b attached to a distal end of the roller 43a or 43. Numbers 46a and 46b indicate coil springs for biasing the arms 42a and 42b in the direction of arrow E, respectively. Numbers 47a–47f indicates 0-rings mounted on the drive shaft 36 for protecting the microfiche film F from damage.

The loading block 12 further comprises a first loading sensor 48 and a second loading sensor 49 for detecting the microfiche film F being inserted. When the film F is loaded into a retrieval apparatus such as a reader-printer, the film F is not always inserted into the insert opening 7 (FIG. 1) from a direction perpendicular thereto but is inserted at an angle at times. In view of this practice, the embodiment under discussion includes the loading sensors 48 and 49 at opposite lateral positions of the loading block 12, which are operatively connected to the loading motor 33, respectively. The loading motor 33 continues operating until the leading end of microfiche film F comes into contact with the support member 25 of the film retainer 22 (FIG. 7). Consequently, the loading motor 33 remains in operation when one of the right and left corners at the leading end of microfiche film F is not in contact with the support member 25 though the other corner is. This assures the microfiche film F stopping with both right and left corners at the leading end thereof contacting the support member 25 instead of stopping at a slant position.

Number 71 indicates a bar code reading sensor of the light transmission type disposed on a planar portion 70 forwardly of the loading sensor 48 in the film inserting direction (see FIG. 5). This sensor 71 includes a plurality of photodiodes arranged in the direction perpendicular to the film inserting direction, i.e. in the direction traversing the bar code 92, for reading the bar code 92 instantly as the microfiche film F is inserted.

The reader-printer according to the present embodiment has the microfiche moving mechanism 3 as described above. How this mechanism 3 operates will now be described with reference to FIG. 5.

First, the controller 5 is operated to move the main X-Y carrier body 17 to the home position for receiving the microfiche film F and to engage a distal end of lift lever 37 with the upper glass plate 23. Whether the main X-Y carrier body 17 is in the home position or not is checked by a home position sensor not shown. Next, the solenoid 40 is electrified for actuating the lift lever 37 to lift the upper glass plate 23. When the microfiche film F is inserted into the insert opening 7 (FIG. 1), the first loading sensor 48 and then the second loading sensor 49 of the loading block 12 detect the microfiche film F and simultaneously the loading motor 33 starts rotating in the direction of arrow G to feed the film F. The film F advances through a space between the guide rollers 41a, 41b and drive shaft 36 under the conveying force of drive shaft 36 and guided in a proper direction by guide rollers 41a, 41b. Ultimately the microfiche film F rests in the position between the upper glass plate 23 and lower glass plate 24 of the main X-Y carrier body 17. When the microfiche film F contacts the support member 25, the solenoid 40 is deelectrified to lower the lift lever 37. As a result, the upper glass plate 23 is lowered to sandwich the microfiche film F with the lower glass plate 24. After lapse of a fixed time the second linear pulse motor 16 is driven to move the main X-Y carrier body 17 in the direction of arrow Y away from the loading block 12, and then the loading motor 33 is stopped. Thereafter the controller 5 is operated to carry out a desired information retrieving operation.

For removing the microfiche film F from the microfiche moving mechanism 3, the controller is similarly operated to move the main X-Y carrier body 17 to the home position. When the main X-Y carrier body 17 is in the home position, the solenoid 40 is electrified for actuating the lift lever 37 to lift the upper glass plate 23. Then the loading motor 33 is driven to remove the microfiche film F from the microfiche moving mechanism 3. The removal of film F is readily confirmed by means of the first and second loading sensors 43 and 44. Finally, upon lapse of a fixed time, the loading motor 33 is stopped to complete the whole operation.

Figure 10:
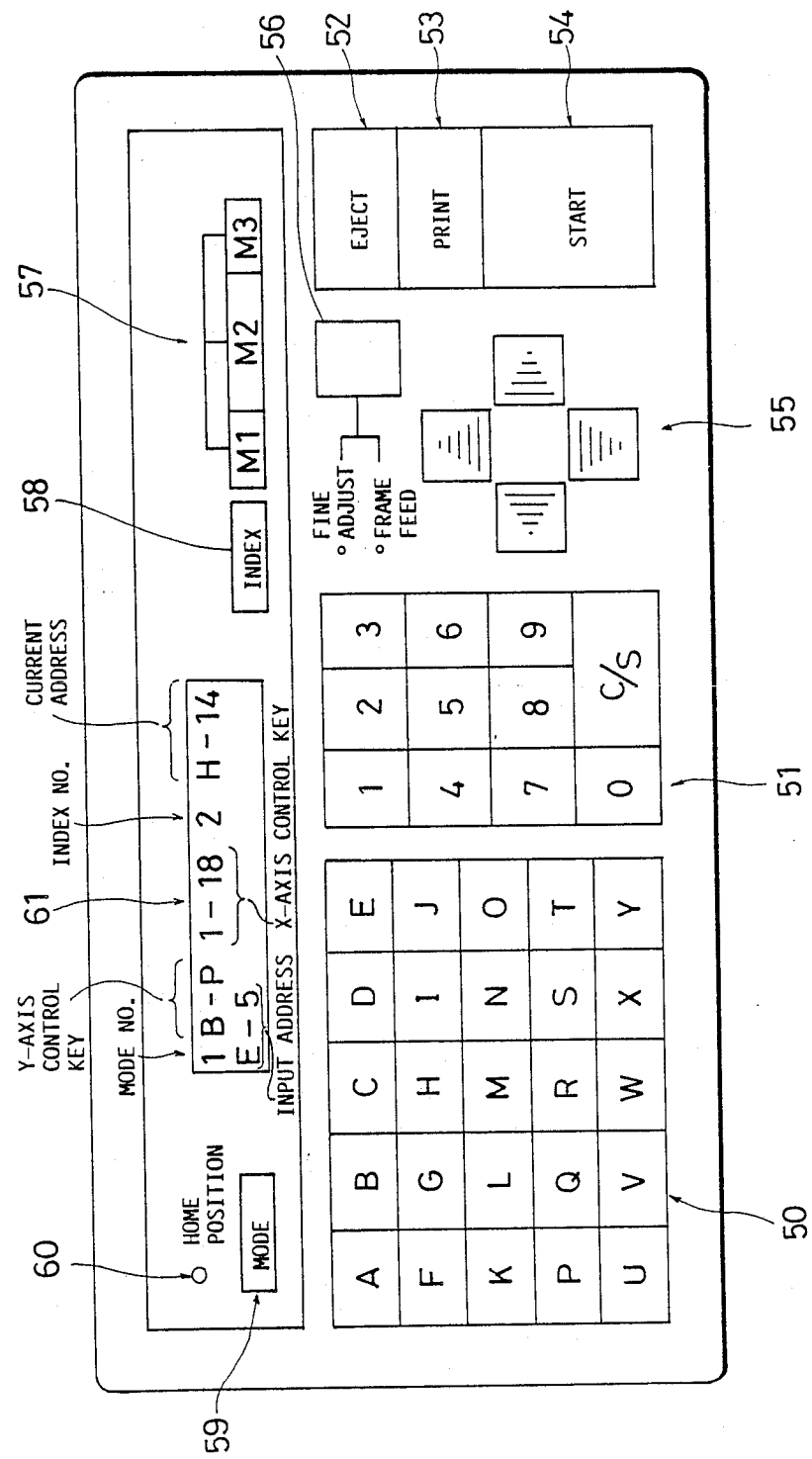
FIG. 10 is a plan view of a controller.

FIG. 10 illustrates one example of controller 5. Number 50 in the drawing indicates Y-axis address keys for designating Y-axis addresses of microfiche film F. Number 51 indicates X-axis address keys for designating X-axis addresses of film F. Number 52 indicates an eject key for driving the first and second linear pulse motors 14 and 16 to move the main X-Y carrier body 17 to the home position for the microfiche film F to be removed from the film moving mechanism 3. Number 53 indicates a print key for instructing a copying operation. Number 54 indicates a start key for starting a searching operation. Number 55 indicates fine adjustment/frame feed keys. Number 56 indicates a select key for selecting between a fine adjustment mode and a frame feed mode to the effected through the keys 55. The fine adjustment/frame feed keys 55 consist of a plus X-direction key 55a, a minus X-direction key 55b, a plus Y-direction key 55c and a minus Y-direction key 55d. When, for example, the fine adjustment mode is selected through the select key 56 and then the plus X-direction key 55a is pressed once, the microfiche film F moves in the plus X-direction by a distance corresponding to one step of the X-axis linear pulse motor 14 or that multiplied by an integer. On the other hand, when the frame feed mode is selected through the select key 56 and plus X-direction key 55a is pressed once, the microfiche film F moves in the plus X-direction by a distance corresponding to one frame. Thus, a next frame is projected on the screen. The other keys 55b to 55d have the same function as the plus X-direction key 55a and are different only in the direction of film movement. Number 57 indicates memory keys for storing input addresses and carrying out various memory operations. Number 58 indicates an index key for selectively designating the indices recorded on the microfiche film F. Number 59 indicates a mode select key for selectively designating modes registered on the format of film F. Number 60 indicates an indicator lamp comprising, for example, a light emitting diode for indicating that the main X-Y carrier body 17 is in the home position for receiving the film F. Number 61 indicates an indicator section for indicating designations made by the Y-axis address keys 50, X-axis address keys 51, index key 58 and mode select key 59, and bar code data read by the reading sensor 71, namely format data and other information necessary for a search.

Figure 11:
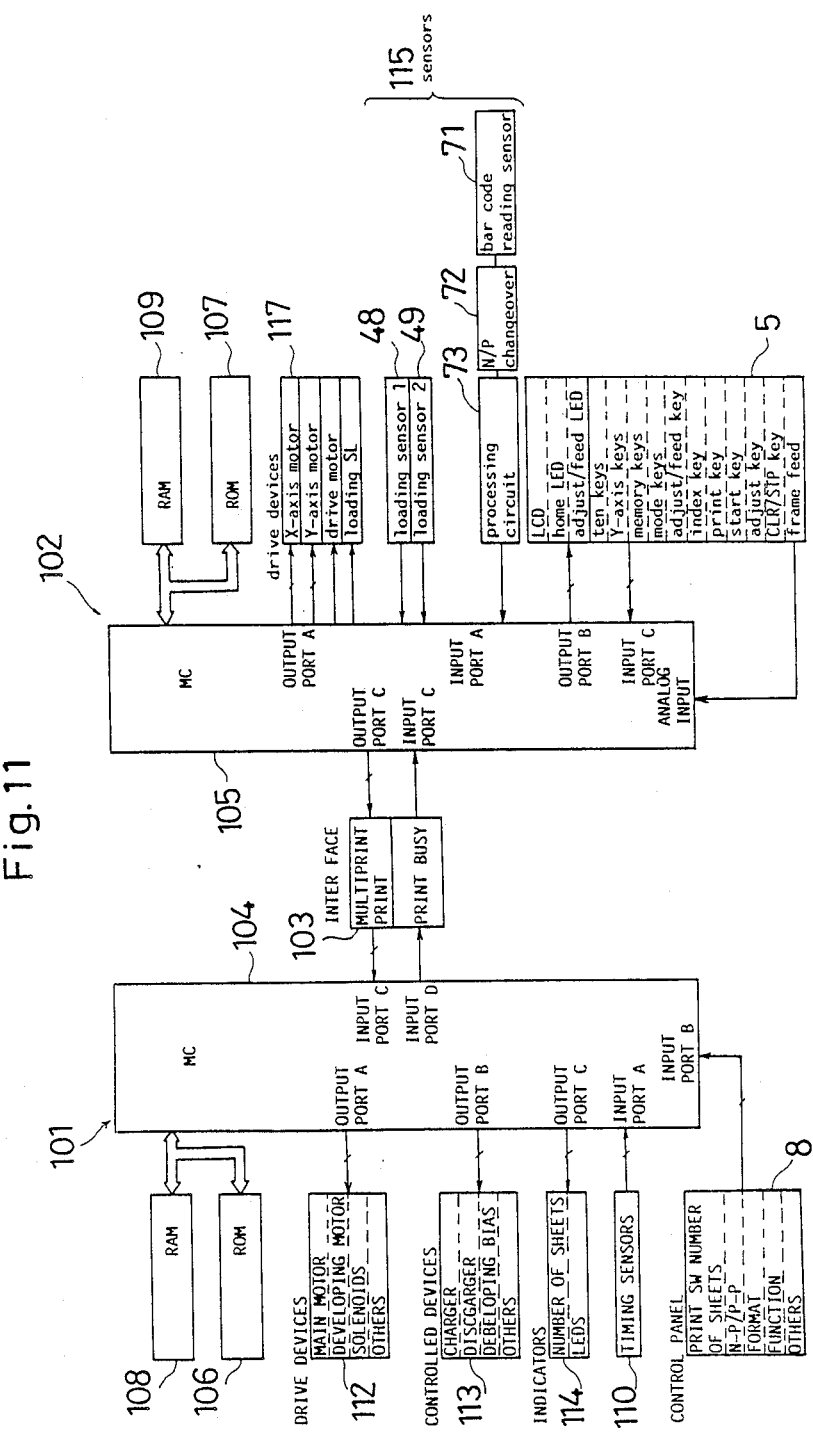
FIG. 11 is a block diagram of a control system of the reader-printer.

FIG. 11 shows a system for controlling the described reader-printer. This system comprises two blocks, i.e. a control block 101 for controlling the main body 2 of the reader-printer and a control block 102 for controlling the microfiche moving mechanism 3. The two control blocks 101 and 102 are interconnected by an interface 103. The interface 103 communicates control signals from one block to the other at times of retrieval in a read mode, and retrieval and printing in a print mode. At a time of so-called multi-printing when a plurality of pages recorded on the microfiche film F are printed, for example, a signal designating a multi-print mode and a print signal are communicated from the control block 102 for the microfiche moving mechanism 3 to the control block 101 for the main body 2, and a print busy signal is communicated in the counter direction from the control block 101 to control block 102. The print busy signal is a signal for prohibiting the microfiche moving mechanism 3 from inadvertently moving upon input of a different signal during a printing operation.

Each of the control blocks 101 and 102 includes a microcomputer 104 or 105, a ROM 106 or 107, and a RAM 108 or 109. The microcomputer 104 of the main body control block 101 has input ports for receiving signals from a timing sensor 110 and from a print switch, a number of pages key, an N-P/P-N changeover key, and other control keys on the control panel 8 of the main body 2, and output ports for supplying control signals to a group of drive devices 112 including a main motor, a developing motor, solenoids and so on, to a group of controlled devices including a charger, a discharger, a developing bias and so on, and to indicating devices 114 such as a number of pages indicator and various light emitting diodes.

The microcomputer 105 of the microfiche moving mechanism control block 102 has input ports for receiving signals from a group of sensors 115 including the loading sensors 48 and 49 and bar code reading sensor 71 and from the ten keys, Y-axis keys, memory keys, mode key, print key, start key and other keys of the controller 5, and output ports for supplying control signals to a group of drive devices 117 including the linear pulse motors 14 and 16 for the X-axis and Y-axis, loading motor 33 and so on, and to the indicators on the controller 5 such as the fine adjustment/frame feed diode, home position diode, and indicating section 61. As distinct from the other sensors, the bar code reading sensor 71 is connected to one of the input ports of microcomputer 105 through an N/P changeover circuit 72 and a processing circuit 73. The N/P changeover circuit 72 acts to invert sensor signal levels in accordance with the type of microfiche film F used, since the bar code has reversed black and white marks depending on whether the film F is a negative film or a positive film. The processing circuit 73 is a waveform shaping circuit for the bar code reading signal to binarize it into a white bar signal and a black bar signal.

Figure 12:
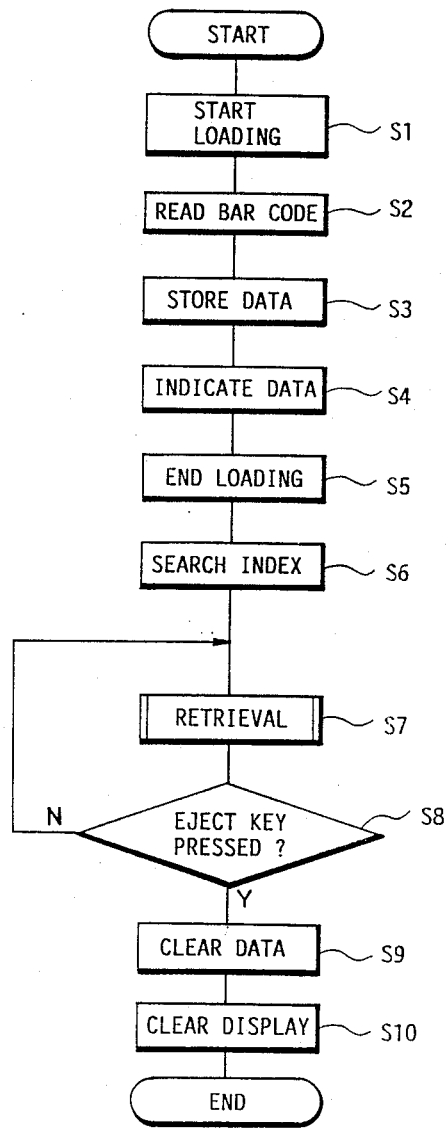
FIG. 12 is a flowchart illustrating a film searching operation.

FIG. 12 is a flowchart illustrating an operating sequence of the microcomputer 105 of the control block 102 for searching the microfiche film F bearing the bar code 92. Assuming that the X-Y carrier is empty of film F, there is nothing displayed on the control panel. When film loading is started at step S1, the program moves to step S2 at which the reading sensor 71 reads the bar code recorded on the film F. The information read at step S2 is stored in RAM 109 of the control block 102 at step S3, which replaces bar code information read previously. The new bar code information is displayed on the control panel at step S4. For example, when a microfiche film having a film format of 270F, rows B-P, columns 1-18 and two indices is loaded, these data are automatically set to the control block 102 with the indicating section 61 automatically giving displays as seen in FIG. 10. It is therefore very convenient with no need for the operator to manually input the above data.

When the film loading has been completed at step S5, the reader-printer moves the main X-Y carrier body at step S6 on the basis of the bar code information read at step S2, to place an index frame image (which is P1 in this embodiment) on the projecting optical path. Thereafter, a retrieval subroutine is called at step S7. The details of the retrieval subroutine will be described later with reference to FIG. 13. After the retrieval operation, step S8 confirms that the eject key is pressed and step S9 clears the bar code information, which eliminates the displays from the indicating section 61 (step S10). In a so-called multi-fiche search for searching a plurality of successive pages, the loaded microfiche film may be identified by means of a serial number thereof displayed on the indicating section 61.

While in this embodiment the information necessary for the search is recorded in the form of a bar code, the information may of course be recorded in any other appropriate form. All that is required for this modification is replacement of the described reading sensor with a different type of sensor.

Figure 13:
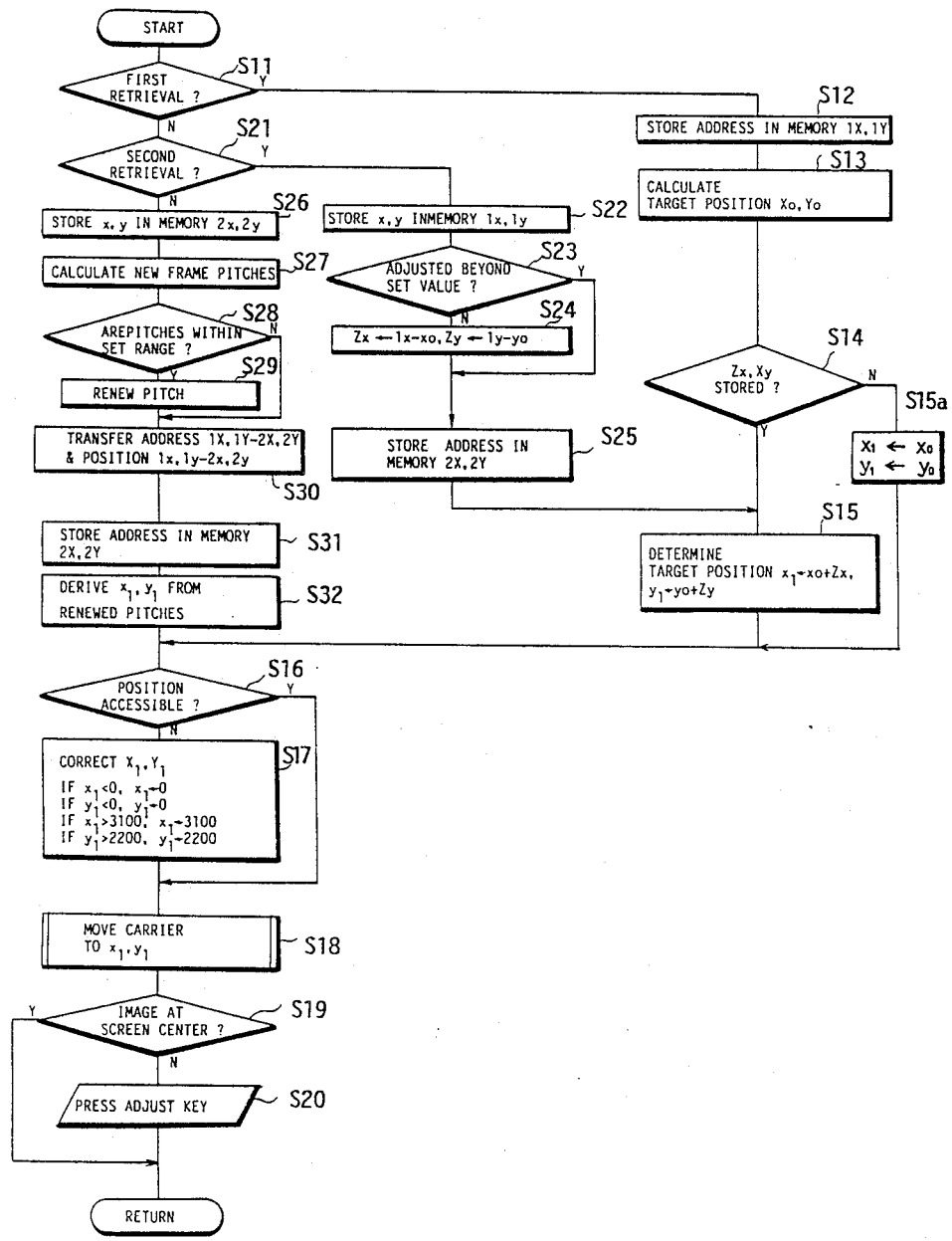
FIG. 13 is a flowchart of a retrieval subroutine.
Figure 14:
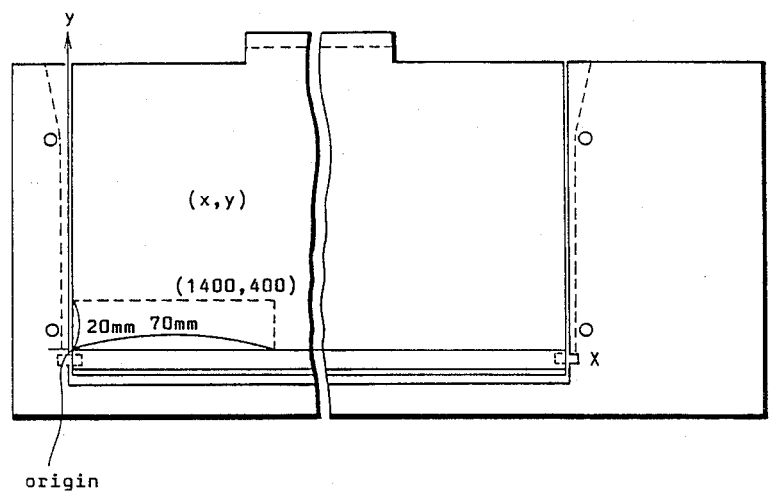
FIG. 14 is a view showing an original position of the X-Y carrier.
Figure 15:
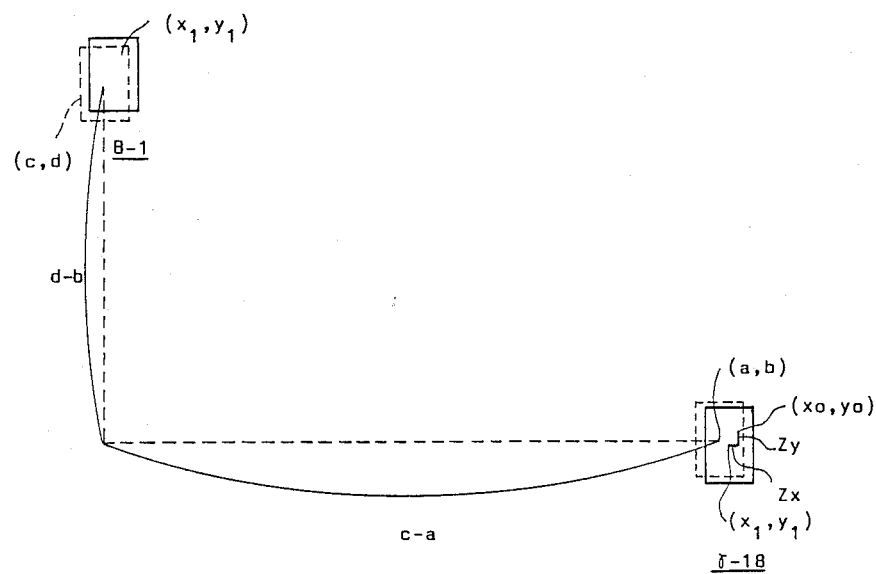
FIG. 15 is a view illustrating misregistration between target positions and normal retrieval positions.

FIG. 13 is a flowchart illustrating an operating sequence of the above-mentioned retrieval subroutine. The symbols and terms used in this flowchart will be defined first. The retrieval address is the position of a frame on the microfiche film given by the row and column, and is expressed as A-13 or B-14, for example. Current point x, y signifies a current position of the main X-Y carrier body 17, target position $x_0$, $y_0$ signifies a target point obtained on the basis of standard pitches, and target position $x_1$, $y_1$ is a target position obtained on the basis of frame pitches derived from two preceding retrieval operations. They all represent coordinates of the main X-Y carrier body 17 necessary for projecting a retrieved frame image on the screen. The origin of this coordinate system is set, for example, to one of the four corners of the main X-Y carrier body 17. The coordinates are designated in units of 50 micrometers which correspond to an amount of movement of the main X-Y carrier body 17 caused by one step of the linear pulse motors 14 and 16. If, for example, as shown in FIG. 14, the axis of the optical system is at a position 70mm in the direction of x and 20mm in the direction of y from the origin, its coordinates $(x, y) = (1400, 400)$. Zx, Zy represent a difference or amount of misregistration between a target position $x_1$, $y_1$ calculated by the control system and an actual retrieval position to which the main X-Y carrier body 17 is moved. FIG. 15 shows this difference Zx, Zy. In the drawing, the solid lines indicate target positions ($x_0$, $y_0$, $x_1$, $y_1$) derived from the standard frame pitches or from the data obtained the previous time and the time before, and the broken lines indicate actual retrieval positions (a, b, c, d) adjusted through the fine adjustment key. The difference Zx, Zy remains memorized after the power is cut off, owing to a memory backup function. 1X, 1Y represent a memory area of RAM 109 storing a retrieval address of the operation before last, and 2X, 2Y a memory area storing a retrieval address of the latest operation. 1x, 1y represent a memory area storing the coordinates of the retrieval address of the operation before last, and 2x, 2y a memory area storing the coordinates of the retrieval address of the latest operation.

The retrieval subroutine will now be described with reference to the flowchart of FIG. 13. The description will be made hereinafter assuming that a frame image at address O-18 is retrieved first after the film is loaded, then a frame image at address B-1 and finally a frame image at address H-10 are retrieved. After the film is loaded, the first retrieval proceeds from step S11 to step S12 for storing retrieval address O-18 in the memory area 1X, 1Y. Next, at step S13, the standard pitches stored in RAM 109 are read out and the row and column of address O-18 are multiplied by the standard pitches to obtain target position $x_0$, $y_0$. The standard pitches are available from the bar code information read at step S2 when loading the microfiche film F. If step S14 finds the amount of misregistration Zx, Zy stored in the memory, this amount is added to $x_0$, $y_0$ at step S15 to obtain target position $x_1$, $y_1$. If, on the other hand, this is the very first search of the microfiche film loaded in the reader-printer and the amount Zx, Zy is not memorized, the target position $x_0$, $y_0$ obtained on the basis of the standard pitches are used as they are at step S15a. Next, step S6 judges whether or not the target position $x_1$, $y_1$ is within a a range mechanically coverable by the main X-Y carrier body. The target position $x_0$, $y_0$ obtained from the standard pitches is normally within such a range, but the target position $x_1$, $y_1$ after correction by adding Zx, Zy can be outside the coverable range. In that case, the program moves to step S7 for making corrections to coordinates as shown in the flowchart. In the flowchart, $x_1 = 3100$ and $y_1 = 2200$ signify an upper limit of the coverable range, a lower limit thereof being $x_1 = 0$ and $y_1 = 0$.

If the target position is within the coverable range, the program moves to step S18 for driving the linear pulse motors to move the main X-Y carrier body to the target position $x_1$, $y_1$. If step S19 finds that the frame image at the target position is projected to the center of the screen, the program makes a return to start the next retrieval. If not, the program moves to step S20 for manually operating the fine adjust key to place the frame image centrally of the screen.

Upon completion of the retrieval of address O-18, i.e. the first retrieval, the program moves forward to retrieval of address B-1. Since this is the second retrieval, the program moves to steps S21 and S22. At step S22, the current position x, y of the main X-Y carrier body is stored in memory area 1x, 1y. The main X-Y carrier body has not moved after completion of the retrieval of address O-18, and therefore its current position is that position, i.e. the adjusted position with the frame image projected centrally of the screen. Then, step S23 judges whether the amount of fine adjustment (equal to the amount of misregistration Zx, Zy) effected through the fine adjust key in the retrieval of address 0–18 exceeded an appropriate range or not. If it did, a frame feed by fine adjustment is judged to have been made and Zx, Zy is left unrenewed. If the amount of fine adjustment is within the appropriate range, the program moves to step S24 for memorizing the amount of misregistration Zx, Zy. The appropriate range of fine adjustment is set to about 25% of the standard frame pitches, for example. Thereafter, at step S25, the second retrieval address B-1 is stored in memory area 2X, 2Y, which is followed by step S15. The subsequent retrieval sequence is executed through steps S16–S20 as in the first retrieval.

The third retrieval proceeds from step 11 to step S21 and then to step S26 et seq. That is, at step S26, the position x, y of the main X-Y carrier body adjusted to place the frame image retrieved in the second retrieval centrally of the screen is stored in memory area $2x$, $2y$ of RAM 109. Then, at step S27, new frame pitches are calculated. The first retrieval address 0–18, the coordinates of address 0–18, the second retrieval address B-1, and the coordinates of address B-1 are stored in memory area 1X, 1Y, memory area $1x$, $1y$, memory area 2X, 2Y, and memory area $2x$, $2y$, respectively. On the basis of these data, the above-mentioned frame pitches are derived from the following equations:

Frame pitch Px in the X direction

Frame pitch $Px$ in the $X$ direction =

$$\left|\frac{2x - 1x}{2X - 1X}\right| = \left|\frac{c - a}{1 - 18}\right| = \left|\frac{c - a}{-17}\right|$$

Frame pitch $Py$ in the $Y$ direction =

$$\left|\frac{2y - 1y}{2Y - 1Y}\right| = \left|\frac{d - b}{B - O}\right| = \left|\frac{d - b}{-13}\right|$$

The calculations are not made where the denominator is zero.

Whether the frame pitches Px and Py are within an appropriate range or not is judged at step S28. This appropriate range is set to about 10% of the standard frame pitches of the film format being retrieved. If the frame pitches obtained as above exceed the appropriate range, a frame feed by fine adjustment is judged to have been made and the frame pitches are not renewed. If the frame pitches are within the appropriate range, these pitches are adopted as new valid pitches at step S29. At step S30, the second retrieval address B-1 and its coordinates are transferred to memory area 1X, 1Y and memory area $1x$, $1y$. Thereafter, at step S31 the third retrieval address H-10 is stored in memory area 2X, 2Y. Then the program moves to step S32 for calculating target position $x_1$, $y_1$ on the basis of the new frame pitches. The subsequent retrieval sequence is executed through steps S16–20 as in the first retrieval.

According to the above retrieval operation, the frame pitches are constantly renewed to enable retrieval to be made with hardly any misregistration. As the cycles of retrieval increase, the frame images are automatically placed centrally of the screen without bothering the operator to operate the fine adjust key.

In the described embodiment, the frame pitches are renewed on the results of the preceding retrieval and the retrieval before that. However, the frame pitch renewals may be effected on the results of all or any number of past retrievals.

Although the present invention has been fully described by way of example with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A microfilm retrieving apparatus for retrieving a desired frame from a plurality of frames recorded on a microfiche film, comprising:
   optical means including a light source and a projecting lens for projecting micro-images of the frames;
   microfilm support means for supporting the microfiche film and movable longitudinally and transversely on a plane substantially perpendicular to a projecting optical path of said optical means;
   drive means for moving said support means;
   read means for reading coded information which includes index information indicative of an address of an index frame on the microfiche film and other information relating to a format of the microfiche film, said coded information being provided in a region outside the micro-images on the microfiche film;
   command generating means for generating an index command; and
   control means for controlling said drive means in accordance with the format information read by said read means for retrieving the desired frames on the projecting optical path, wherein said control means retrieves the index frame of the microfiche film on the projecting optical path in response to said index command.

2. A microfilm retrieving apparatus as claimed in claim 1, further comprising an insert opening for inserting the microfiche film, and transport means for transporting the microfiche film inserted through said insert opening to said support means, wherein said read means is provided on a film transport passage of said transport means.

3. A microfilm retrieving apparatus as claimed in claim 1, further comprising display means for displaying the format information read by said read means.

4. A microfilm retrieving apparatus as claimed in claim 1, further comprising input means for inputting an address of the desired frame to be retrieved, wherein said control means controls said drive means in response to the address inputted by said inputting means for retrieving the desired frame of said address on said projecting optical path.

5. A microfilm retrieving apparatus for retrieving a desired frame from a plurality of frames recorded on a microfiche film, comprising:
   optical means including a light source and a projecting lens for projecting micro-images of the frames;
   film support means for supporting the microfiche film and movable longitudinally and transversely on a plane intersecting a projecting optical path of said optical means;
   drive means for moving said support means;
   input means for designating an address of the desired frame to be retrieved from a plurality of the frames recorded on the microfiche film;

memory means for storing the address of the desired frame designated by said input means, frame pitches, and a current position of said film support means;

retrieving means for calculating amounts of movement of said film support means in accordance with the inputted address of the desired frame, the frame pitches, and the current position stored in said memory means, and controlling said drive means to move the film support means by the calculated amounts, thereby retrieving the desired frame on said projecting optical path;

adjusting means for slightly moving said film support means to adjust the position of the desired frame retrieved in respect to the projecting optical path; and correcting means for correcting the values of the frame pitches stored in the memory means in accordance with the amount of the adjustment of said adjusting means.

6. A microfilm retrieving apparatus as claimed in claim 5, further comprising initializing means for initializing values of the frame pitches stored in said memory means when the microfiche film supported by the film support means is changed.

7. A microfilm retrieving apparatus as claimed in claim 6, wherein said initializing means includes read means for reading coded information relating to a format of the microfiche film provided on the microfiche film, the frame pitches being initialized in accordance with the format information read by said read means.

8. A microfilm retrieving apparatus as claimed in claim 7, further comprising an insert opening for inserting the microfiche film, and transport means for transporting the microfiche film inserted through said insert opening to said support means, wherein said read means is provided on a film transport passage of said transport means.

9. A microfilm retrieving apparatus as claimed in claim 1, wherein said command generating means includes an index key which is manually operable.

10. A microfilm retrieving apparatus as claimed in claim 1, wherein said command generating means generates the index command when the microfiche film supported by the support means is changed.

11. A microfilm retrieving apparatus as claimed in claim 1, wherein said command generating means generates the index command when the reading means reads the coded information.

12. A microfilm retrieving apparatus as claimed in claim 1 further comprising loading means for automatically loading the microfiche film in said support means.

13. A microfilm retrieving apparatus as claimed in claim 12, wherein said reading means reads the coded information during the film loading period of said loading means.

14. A microfilm retrieving apparatus as claimed in claim 13, wherein said command generating means generates the index command when the reading means reads the coded information.

15. A microfilm retrieving apparatus for retrieving a desired frame from a plurality of frames recorded on a microfiche film, comprising:

a movable film support mechanism for supporting the microfiche film;

reading means for reading coded information on the margin of the microfiche film, said coded information relating to a position of an index frame of the microfiche film;

command generating means for generating an index command; and retrieving means for retrieving the index frame at a predetermined position in accordance with the coded information read by said reading means when said command generating means generates the index command.

16. A microfilm retrieving apparatus as claimed in claim 15, wherein said command generating means includes an index key which is manually operable.

17. A microfilm retrieving apparatus as claimed in claim 15, further comprising loading means for automatically loading the microfiche film in said film support mechanism;

wherein said reading means reads the coded information when the microfiche film is loaded.

18. A microfilm retrieving apparatus as claimed in claim 17, wherein said command generating means generates the index command when said reading means reads the coded information.

19. A microfilm retrieving apparatus for retrieving a desired frame from a plurality of frames recorded on a microfiche film, comprising:

movable film support means for supporting the microfiche film;

designating means for designating an address of the desired frame to be retrieved;

memory means which stores a frame pitch of the microfiche film;

retrieving means for moving said support means in accordance with the address designated by said designated means and the frame pitch stored in said memory means, thereby retrieving the desired frame at a retrieving position;

adjusting means for slightly moving said support means for adjusting the position of the desired frame retrieved by said retrieving means; and correcting means for correcting the frame pitch stored in said memory means in accordance with the amount of the adjustment of said adjusting means, whereby following retrieving is effected in accordance with the corrected frame pitch.

20. A microfilm retrieving means as claimed in claim 19 further comprising:

reading means for reading coded information recorded on a margin of the microfiche film, said coded information relating to a format of the microfiche film; and initializing means for initializing said frame pitch stored in the memory means in accordance with the coded information read by said read means.

* * * * *